United States Patent Office 2,695,280
Patented Nov. 23, 1954

2,695,280

VINYL CHLORIDE POLYMERS PLASTICIZED WITH TRIALKYL-1-BENZOYLPROPANE-1,2,3 TRICARBOXYLATES

Joachim Dazzi, Dayton, Ohio, assignor to Monsanto Chemical Company, St. Louis, Mo., a corporation of Delaware No Drawing. Original application May 24, 1951, Serial No. 228,111, now Patent No. 2,667,504, dated January 26, 1954. Divided and this application August 6, 1953, Serial No. 372,797

5 Claims. (Cl. 260—31.8)

The present invention relates to organic compounds and deals more particularly with addition products of dialkyl fumarates and certain keto-esters, to methods of preparing the same, and to vinyl chloride polymers plasticized with the addition products.

According to the invention there are provided new and valuable polycarboxylates in which one mole of a dialkyl fumarate of from 6 to 12 carbon atoms is combined with one mole of an alkyl aroylacetate in which the alkyl radical has from 1 to 4 carbon atoms and the aroyl radical is selected from the class consisting of the benzoyl, the 2-toluoyl, the 3-toluoyl and the 4-toluoyl radicals. The new polycarboxylates are formed by a simple addition reaction, in which one mole of the fumarate adds to one mole of the aroylacetate. While the structure of the 1:1 adducts thus formed cannot be definitely determined, the adducts are believed to be trialkyl 1-aroylpropane-1,2,3-tricarboxylates, the addition reaction proceeding probably according to the scheme:

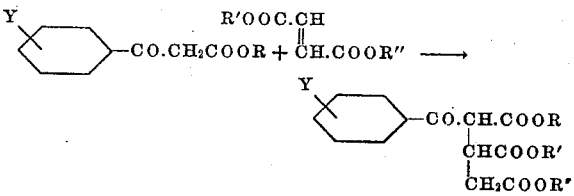

in which Y is selected from the class consisting of hydrogen and the methyl radical and R, R' and R" are alkyl radicals of from 1 to 4 carbon atoms.

Dialkyl fumarates useful for the preparation of the present adducts are esters in which the alcohol portions of the molecule are derived from one alcohol, i. e., the diethyl, dimethyl, di-isopropyyl, di-n-propyl, di-n-butyl, di-tert-butyl or diisobutyl fumarates, or mixed esters such as ethyl methyl fumarate, propyl ethyl fumarate, butyl ethyl fumarate, etc. Examples of aroylacetates useful for the present purpose are methyl, ethyl, isopropyl, n-propyl, n-butyl, isobutyl or tert-butyl benzoylacetate, methyl 2-toluylacetate, n-propyl 3-toluylacetate, isobutyl 4-toluyl-acetate, etc.

The addition reaction is effected simply by heating the fumarate with the aroylacetate at a temperature of at least 200° C. until formation of the 1:1 adduct has occurred. The heating temperature may be from 200° C. to 300° C., depending upon the nature of the individual reactants; it should not exceed a temperature at which either reactant is decomposed. Refluxing temperatures of the reaction mixture are preferred. Termination of the reaction is generally evidenced by noting cessation in rise of the refluxing temperature. The course of the reaction may also be followed by noting the change in the refractive index of the reaction mixture.

Since the present products are formed by the addition of one mole of the fumarate to one mole of the keto-ester, molar equivalents of the reactants may be advantageously employed in the reaction mixture. However, since any unreacted materials may be readily recovered from the reaction product, an excess of either reactant may be used; and in order to assure complete reaction of the less readily available keto-esters, it is generally preferred to use an excess of the dialkyl fumarate in the initial reaction mixture. An excess of the fumarate also serves as a diluent for the reaction.

The present adducts are stable, high-boiling polycarboxylates which range from clear, viscous liquids to waxy solids. They are advantageously used for a variety of industrial purposes, and are characterized by conferring improved plasticity to synthetic resins and plastics when incorporated therein. They impart increased flexibility to vinyl chloride polymers, which flexibility is retained at even low temperatures. At high temperatures, the present adducts are not readily volatilized from the plasticized composition, even when present in concentrations of up to 50% by weight.

The invention is further illustrated, but not limited, by the following examples.

*Example 1*

A mixture of 76.9 g. (0.4 mole) of ethyl benzoylacetate and 207 g. (1.2 moles) of diethyl fumarate was refluxed for 77 hours at a temperature of from 220° C. to 256° C. Fractionation of the resulting product gave a fraction B. P. 180–268° C./0.7–1.4 mm., which upon redistillation gave 46.4 g. of an adduct in which one mole of ethyl benzoylacetate is combined with one mole of diethyl fumarate (probably triethyl 1-benzoyl-propane-1,2,3-tricarboxylate,) B. P. 196–210° C./0.7 mm., $N_D^{25}$ 1.4875 having a saponification equivalent of 107.5 and an acid content of 5.13%.

*Example 2*

60 parts of polyvinyl chloride and 40 parts by weight of the adduct of Example 1 were mixed on a rolling mill to a homogenous blend. During the milling there was observed substantially no fumes and discoloration. A molded sheet of the mixture was clear, transparent and substantially colorless. Testing of the molded sheet by the Clash-Berg method gave a low temperature flexibility value of 4° C. Tests on the volatility characteristics of the plasticized composition employing the method described by the American Society for Testing Materials under the designation D-744-44T gave a volatility value of 2.7 per cent. When subjected to a heat of 225° F. for a period of 30 minutes the clarity and color of the molded product were substantially unchanged.

While the above example shows only compositions in which the ratio of plasticizer to polymer content is 40:60, this ratio being employed in order to get comparable efficiencies, the content of adduct to polyvinyl chloride may be widely varied, depending upon the properties desired in the final product. For many purposes a plasticizer content of, say, from only 10 per cent to 20 per cent is preferred. The present adducts are compatible with polyvinyl chloride over wide ranges of concentrations, up to 50 per cent of esters based on the total weight of the plasticized composition yielding desirable products.

Although the invention has been described particularly with reference to the use of the present adducts as plasticizers for polyvinyl chloride, they are advantageously employed also as plasticizers for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized materials does not impair the valuable properties of the present esters. The present adducts are of general utility in softening vinyl chloride polymers. They may be used as the only plasticizing component in a compounded vinyl chloride polymer or they may be used in conjunction with other plasticizers.

This is a division of my application Serial No. 228,111, filed May 24, 1951.

What I claim is:

1. A resinous composition comprising a vinyl chloride polymer plasticized with a tricarboxylate having the formula:

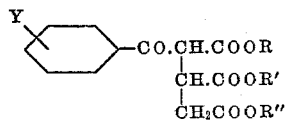

in which Y is selected from the class consisting of hydrogen and the methyl radical and R, R' and R" are alkyl radicals of from 1 to 4 carbon atoms.

2. A resinous composition comprising a polyvinyl chloride plasticized with a tricarboxylate having the formula:

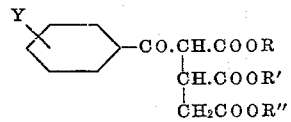

in which Y is selected from the class consisting of hydrogen and the methyl radical and R, R' and R" are alkyl radicals of from 1 to 4 carbon atoms.

3. A resinous composition comprising a polyvinyl chloride plasticized with a tricarboxylate having the formula:

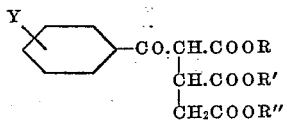

in which Y is selected from the class consisting of hydrogen and the methyl radical and R, R' and R" are alkyl radicals of from 1 to 4 carbon atoms, said tricarboxylate being up to 50% of the resinous composition.

4. A resinous composition comprising polyvinyl chloride plasticized with a trialkyl 1-benzoylpropane-1,2,3-tricarboxylate in which the alkyl radical has from 1 to 4 carbon atoms, said tricarboxylate being up to 50% of the resinous composition.

5. A resinous composition comprising polyvinyl chloride plasticized with triethyl 1-benzoylpropane-1,2,3-tricarboxylate, said tricarboxylate being up to 50% of the resinous composition.

No references cited.